United States Patent Office 3,424,780
Patented Jan. 28, 1969

3,424,780
PROCESS FOR MANUFACTURING
POLYISOCYANATES
Adnan A. R. Sayigh, North Haven, Conn., assignor to
The Upjohn Company, Kalamazoo, Mich., a corporation of Delaware
No Drawing. Continuation-in-part of application Ser. No. 31,829, May 26, 1960. This application Mar. 16, 1964, Ser. No. 352,318
U.S. Cl. 260—453            4 Claims
Int. Cl. C07c 119/04

ABSTRACT OF THE DISCLOSURE

A process for coverting aliphatic, cycloaliphatic and araliphatic poly primary amines to the corresponding polyisocyanates by phosgenation without concurrent formation of chlorine-containing by-products. This result is achieved by keeping the phosgenation reaction temperature between 110° C. and 135° C. and the solvent to diamine weight ratios within 18:1 to 30:1.

CROSS-REFERENCE TO RELATED APPLICATION

This application is a continuation-in-part of application Ser. No. 31,829 filed May 26, 1960, now abandoned.

The present invention relates to a process for the preparation of aliphatic, cycloaliphatic and araliphatic polyisocyanates. More particularly, it relates to the production of diisocyanates of this type.

The production of diisocyanates is usually accomplished in one of two ways. One, known as the hydrochloride method, consists in converting the amine to the hydrochloride. The resulting slurry is then stirred, and converted to the diisocyanate by passing phosgene through it while heating. The other method, the cold-hot base phosgenation, comprises adding free amine to excess phosgene, preferably condensed in inert solvent at low temperature. The slurry so produced is heated while more phosgene is passed through it to complete the reaction.

In the prior art, aliphatic diisocyanates are manufactured by either method at temperatures ranging from 145°–175° C. in a variety of inert solvents in the ratio of 8–10 parts by weight of solvent to 1 of diamine. At these temperatures and dilution, not only are prolonged time cycles required but also considerable amounts of chloromonoisocyanates are formed, the amounts of these impurities ranging from 1 to 5 percent depending upon the type of the diamine and temperature employed. The patent literature contains no reference to the formation of these impurities except in the case of the manufacture of hexamethylene diisocyanate where 6-chlorohexylisocyanate was reported to be in the product to the extent of at least 5%.

In either method, however, there is produced, in addition to the desired diisocyanate, alkylchlorides from monoamines and monochloroisocyanate and/or dichloroalkane from the diamine according to the following reactions:

$$RNH_2 + COCl_2 \rightarrow RNCO + RCl + HCl$$
$$H_2NRNH_2 + COCl_2 \rightarrow OCNRNCO + ClRNCO$$
$$+ ClRCl + HCl$$

The formation of three impurities presumably arises from the displacement of an —NHCOCl or an —N=C=O group by chloride ion which is unavoidably present in the reaction mixture. This side reaction is found to take place irrespective of the method of conversion, whether it is the hydrochloride method or the cold-hot base phosgenation method.

These same difficulties are also encountered in conversion to isocyanates of cycloaliphatic polyamines, i.e., polyamines in which the amino groups are attached to a cycloaliphatic radical either directly to a ring carbon or thru an aliphatic chain of one or more carbon atoms, and araliphatic polyamines, i.e., polyamines in which the amino groups are attached to an aromatic nucleus thru an aliphatic chain of one or more carbon atoms.

It is also known that the conversion of aliphatic, cycloaliphatic, and araliphatic diamines to the corresponding diisocyanates is more difficult than the conversion of aromatic ones. In the former cases, much longer time and higher temperatures are required.

The presence of aliphatic chloromonisocyanate in the diisocyanates formed during the manufacture of the latter is very objectionable in making high molecular weight polyurethanes. The monoisocyanate would, undoubtedly, act as a chain terminator and in consequence, low molecular weight polyurethanes would be formed instead of the desired high molecular weight ones. Further, the presence of chloride in the polyurethanes renders them susceptible to discoloration on exposure to light and, consequently, limits their utility in the manufacture of light-stable polyurethanes.

It is found generally true that chloroisocyanates are formed in all the aliphatic diisocyanates which we have made, such as hexamethylene diisocyanate, nonamethylene and decamethylene diisocyanates and in much larger quantities in m-xylylene diisocyanate, p-xylylene diisocyanates and p-1,8-menthane diisocyanates. The boiling points of diisocyanates and the chlorides derived from them are found to be quite close, so that separation by fractional distillation is difficult and not practical from a commercial point of view. This is especially true for those of relatively high molecular weight where high vacuum, due to the sensitivity of the isocyanates to heating and especially prolonged heating, is necessary for their distillation. It is well known that on heating isocyanates at 150–200° C. carbon dioxide and amorphous materials, carbondiimides, are formed.

It is a principal object of this invention to arrive at a practical process whereby the formation of these impurities is reduced to a minimum, rendering them harmless for the various applications mentioned. Another object is to provide a commercially attractive process for the synthesis of aliphatic, cycloaliphatic and araliphatic diisocyanates in high yields and purity. A further object of the invention is to devise a process whereby the diisocyanates need not be fractionally distilled to obtain high purity materials.

It has now been found that the disadvantages of the prior art can be avoided and the desired polyisocyanates be produced in high yields in a short time and in a highly purified form by carrying out the phosgenation at temperatures from about 110° C. to about 135° C. and with a solvent to diamine weight ratio of between about 18 to 1 to about 30 to 1. The improvements of the present invention are applicable to both the hydrochloride and the cold-hot base phosgenation method of producing isocyanates; it is more useful however, when applied to the hydrochloride process in which case the solvent/diamine ratio is calculated on the basis of the free amine.

It was found that the purest products are obtained when the temperature was maintained between 120–128° and that the yields are highest when the solvent:diamine ratio is in the range of 18:1 to 30:1. When low weight ratios of solvent to diamine are used, long periods of time are required. The prolonged periods of time are not only impractical but also contributed to the decomposition of the diisocyanates and as a result, poor yields were obtained.

The choice of solvent used in the present invention is not critical so long as it is an inert solvent, i.e., does not react with HCl, $COCl_2$ or the isocyanates formed. Generally, solvents having a boiling point of 110° C. or above may be used. Merely by way of illustration, some examples of such solvents are: chlorobenzene, o-dichlorobenzene, toluene, xylene, n-octane, and anisole.

While the examples described herein show the production of diisocyanates, it will be apparent that the present process is equally applicable to the preparation of tri- or higher polyisocyanates in high yields of highly purified products.

It is to be understood, of course, that substituted diamines may also be used in the present process. Such substituents may be, for example, nitro groups, alkyl radicals, and halogens.

The improved process of the invention can be used advantageously for the conversion of any aliphatic cycloaliphatic, or araliphatic polyamine to the corresponding polyisocyanate provided only that the amino groups are convertible to isocyanato groups by phosgenation, i.e., provided the amino groups are primary amino groups. Advantageously also the polyamine should be free of other groups reactive with phosgene. Other than this there are no limitations as to the types of aliphatic, cycloaliphatic, and araliphatic polyamines to which the processes of the invention can be applied. Still the present process is not practical for the conversion of polyamines having less than 5 carbon atoms due to the length of time required. Nevertheless, it is applicable to short chain polyamines having relatively large alkyl groups attached to the carbon chain, because the presence of these groups tends to increase the solubilities of the polyamine hydrochlorides in the solvents and, therefore, an increase in the rate of phosgenation results. From the foregoing statement, it is also to be understood that the process is applicable to branched as well as straight chain polyamines and to saturated as well as unsaturated. With the higher molecular weight hydrochlorides, that is, those containing from 11 to 20 carbon atoms, which are much more soluble in the solvents than the $C_5$ to $C_{10}$ polyamine hydrochlorides, the temperature of the reaction is a more important factor than the dilution. Nevertheless, in these cases dilution definitely enhances the rate of reaction considerably.

From the previous discussion it will be apparent that the following examples describe the present invention without, however, limiting the same thereto.

EXAMPLE I

The following experimental details describe the recommended procedure for the manufacturing of m-xylylene diisocyanate.

In a five-liter round-bottom flask equipped with a stirrer, efficient condenser, thermometer and a gas-inlet tube were placed 136 grams (1 mole) of commercial m-xylylene diamine (Oronite) and 3,100 ml. of chlorobenzene (solvent/diamine weight ratio=24.6). While agitating, dry hydrogen chloride was passed through, at a rate of 1690 cc. per minute allowing the temperature to rise to 60° C. After one hour complete conversion of the diamine to its dihydrochloride occurred. The resulting rather thin and easily agitated slurry was heated to a reflux and 70 ml. of chlorobenzene-water azeotrope were removed. (Solvent/diamine weight ratio now=24.) Phosgene was then passed through a flow-meter to the dry reaction mixture at a rate of 221 cc. per minute while maintaining the temperature between 120–125° C. After 10–12 hours, a clear yellow solution resulted. The solution contained a very small amount of white solid (very fluffy). It was purged at reflux with dry nitrogen for 1–2 hours and cooled to room temperature, 25–30° C.; filtered with suction and a 50 gram portion of the filtrate analyzed; from this it was found that the total yield of m-xylylene diisocyanate was 183 grams or 98.0% yield. The chlorobenzene was removed under vacuum and the residue was transferred to a 300 ml. flask and distilled under vacuum. The fraction of m-xylylene diisocyanate boiling at 126° C./1 mm. was collected and found to weigh 178 grams (91.4% yield). It was analyzed and found to be 99.3% pure and to contain 0.08% total chloride.

EXAMPLES II–IV

These examples were carried out as in Example I except o-dichlorobenzene was used instead of chlorobenzene and at the various temperatures indicated. The results are summarized below and compared with Example I to illustrate the effect of temperature on quality of the product.

| Example | Temp., °C. | Yield | Percent purity | Percent total chloride |
|---|---|---|---|---|
| II | 160 | 90.0 | 97.2 | 1.24 |
| III | 150 | 89.3 | 97.7 | 1.00 |
| IV | 140 | 91.2 | 98.9 | 0.70 |
| I | 120–125 | 91.4 | 99.3 | 0.08 |

EXAMPLES V–VIII

These examples were carried out as in Example I except various ratios of chlorobenzene to m-xylylenediamine were used, and the temperature range was 124–128° C. The results are summarized below to illustrate effect of dilution on the yield of m-xylylene diisocyanate and the time of the reaction.

| Example | Chlorobenzene to m-xylylene diamine weight ratio | Yield | Time, hours |
|---|---|---|---|
| V | 10:1 | 80 | 46 |
| VI | 15:1 | 84.5 | 33 |
| VII | 20:1 | 87.5 | 20 |
| VIII | 24:1 | 91.4 | 12 |

EXAMPLE IX p-1,8-menthane diisocyanate

In the usual apparatus, 85 grams (0.5 m.) of 1,8-diamino-p-menthane was dissolved in 1,615 ml. of chlorobenzene and converted to the dihydrochloride. The slurry was then heated to reflux and 100 ml. of chlorobenzene were distilled off to insure drying the mixture. (Solvent/diamine weight ratios=20.) Phosgene was then passed in at a rate of 220 cc. per minute and the unreacted phosgene was collected in a flask cooled with Dry Ice and acetone; the temperature of the reaction was 125–126° C. When 120% of the theoretical amount of phosgene had been passed in, the collected phosgene plus HCl was repassed through the reaction mixture. This operation was repeated three or four times over a period of 18 hours. At the end of this time, the reaction mixture was clear amber in color.

Chlorobenzene was distilled off and the residue distilled at 0.4–0.5 mm. and the fraction boiling at 94–110° C., was collected; it weighed 98.5 grams (88.7% yield). Analysis indicated it to be 99.1% pure p-1,8-menthane diisocyanate and to contain 0.09 total chloride.

EXAMPLE X

Hexamethylene diisocyanate 116 grams of hexamethylene diamine (1 mole) in 2,940 grams of chlorobenzene were converted to hexamethylene diisocyanate following the procedure outlined in Example 1. (Solvent/diamine weight ratio=25.) The yield of hexamethylene diisocyanate was 151 grams (90% yield). Its boiling point was 101–103° C./2.7 mm.; $n_D^{25}$ 1.4501. The product was found to be 99.0% pure.

EXAMPLE XI

Hexamethylene diisocyanate 116 grams of hexamethylene diamine (1 mole) in 1000 grams of o-dichlorobenzene were converted to hexamethylene diisocyanate at 165–170° C., following the procedure outlined in Example I. (Solvent/diamine weight ratio=8.) The yield was 115.8 grams (69%); the product was found to be 97.0% pure.

EXAMPLE XII

Mixed dimethyl m-xylylene diisocyanates (4,6-dimethyl-m-xylylene diisocyanate and 2,4-dimethyl-m-xylylene diisocyanate)

100 grams of mixed diamines, melting point, 120–124° C., were dissolved in 2,400 grams of anisole at 80° C. (Solvent/diamine weight ratio=24.) Anhydrous hydrogen chloride was passed through a flowmeter to the solution until complete conversion of the diamine to its dihydrochloride occurred. The hydrogen chloride was then replaced by phosgene, and the solution was heated gradually until a temperature of 125–135° C. was reached. The reaction mixture was maintained at this temperature until complete reaction occurred as indicated by the clarity of the solution. This required 7 hours. The clear, rather dark solution was purged with dry nitrogen to remove any dissolved phosgene and was then distilled under vacuum. The fraction boiling at 160–165° C. and 3.0 mm. was collected. The yield of the colorless liquid diisocyanate was 90% of the theoretical amount ($n_D^{20}$ 1.5424.) Calculated equivalent weight=108; found equivalent weight=109.

A small fraction was converted with dry methanol to the corresponding mixed diurethane of the following structural formulas:

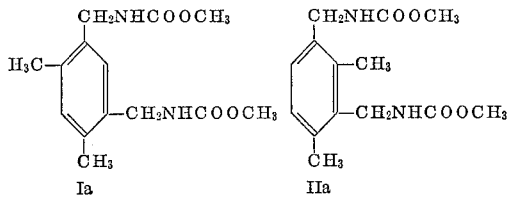

which were separated by fractional crystallization from chlorobenzene (Ia, melting point=180° C.; IIa, melting point=130° C.). The mixed diisocyanates and their urethane derivatives have the following analysis:

Calculated for the diisocyanates $C_{12}H_{12}N_2O_2$: C, 66.6%; H, 5.5%; N, 13.0%. Found: C, 66.5%; H, 5.7%; N, 13.1%.

Calculated for the dimethylurethane $C_{14}H_{20}N_2O_4$: C, 60.0%; H, 7.2%; N, 10.0%. Found: C, 60.2%; H, 7.1%; N, 10.1%.

EXAMPLE XIII

4,6-dimethyl-1,3-xylylene diisocyanate 100 grams of the pure diamine isomer (melting point=129–130° C.), which had been purified by crystallization from chlorobenzene, were converted in essentially the same procedure as Example I except that n-octane was used as a solvent. There was a 93% yield of colorless liquid, B.P.=140–142° C./0.8 mm., $n_D^{20}$ 1.5435. Calculated equivalent weight=108; found equivalent weight=109.

A small sample was converted with methanol to its dimethylurethane (Ia), M.P.=180° C., identical with the one obtained from the mixture. The diisocyanate and the urethane have the following analysis:

Calculated for $C_{12}H_{12}N_2O_2$: C, 66.6%; H, 5.6%; N, 13.0%. Found: C, 66.7; H, 5.5%; N, 12.8%.

Calculated for $C_{14}H_{20}N_2O_2$: C, 60.0%; H, 7.2%; N, 10.0%. Found: C, 59.8%; H, 7.3%; N, 10.1%.

EXAMPLE XIV

Pentamethylene diisocyanates 51 grams of pentamethylene diamine (0.5 mole), in 1,500 grams of anhydrous chlorobenzene were converted to pentamethylene diisocyanate by following the procedure outlined in Example I. (Solvent/diamine weight ratio=29.) The yield was 69 grams or 90% of theory. Its boiling point was 105° C./4.0 mm. Equivalent weight calculation=77.1; equivalent weight found=76.3 or 99% pure.

EXAMPLE XV

Nonamethylene diisocyanate 158 grams of nonamethylene diamine (1 mole) were dissolved in 3,950 grams of anhydrous chlorobenzene and converted to nonamethylene diisocyanate according to the procedure outlined in Example I. (Solvent/diamine weight ratio=25.) Nonamethylene diisocyanate distilled at 134° C./0.6 mm. The yield was 91% of theory. Equivalent weight calculation=105; equivalent weight found=104.5 or 99% pure.

EXAMPLE XVI

Decamethylene diisocyanate

Following the procedure of Example I, 172 grams of decamethylene diamine (1 mole) in 4,300 grams of anisole were converted to decamethylene diisocyanate in 93% yield. (Solvent/diamine weight ratio=25.) Its boiling point was 132° C./0.2 mm. Equivalent weight calculation=112.2; equivalent weight found=113.1 or 99% pure.

EXAMPLE XVII m-Xylyldiisocyanate

In a 5-liter flask equipped with a mechanical stirrer, a condenser, a thermometer, and an addition funnel, was placed 3030 ml. of dry monochlorobenzene. The flask was cooled to 0–5° C. with an ice-salt bath and about 250 g. of phosgene was condensed into the reaction mixture in a period of about 1½ hours. 136 g. of m-xylylene diamine (1 mole) was then added dropwise with vigorous stirring while maintaining a temperature below 10° C. (Solvent/diamine weight ratio=24.) The ice bath was removed and the reaction mixture was warmed to 110° C. and a slow stream of phosgene passed in at the rate of about 220 ml. per minute. The temperature was then brought to 125° C. and held there until a clear, slightly tan solution resulted. The apparatus was then purged with dry nitrogen for about 1 hour and the solvent distilled off under vacuum. The reaction mixture was then distilled at 0.1–0.2 ml. mercury to yield 163 g. (87% yield) of m-xylyldiisocyanate containing 0.4% chlorine.

As many and varied modifications of the subject matter of this invention will become apparent to those skilled in the art from the detailed description given herein, it should be understood that this invention is to be limited only in accordance with the appended claims.

I claim:

1. In a process for making hexamethylene diisocyanate by phosgenation of hexamethylene diamine dihydrochloride in an inert solvent, the improvement which comprises carrying out said phosgenation at a temperature of about 110° to 135° C. and in the presence of said inert solvent in an amount which is in the ratio of about 18 to 30 parts per part of the hexamethylene diamine, by weight.

2. In a process for making pentamethylene diisocyanate by phosgenation of pentamethylene diamine dihydrochloride in an inert solvent, the improvement which comprises carrying out said phosgenation at a temperature of about 110° to 135° C. and in the presence of said inert solvent in an amount which is in the ratio of about 18 to 20 parts per part of the pentamethylene diamine, by weight.

3. In a process for making meta-xylene diisocyanate by phosgenation of meta-xylylene diamine dihydrochloride in an inert solvent, the improvement which comprises carrying out said phosgenation at a temperature of 110° to 135° C. in the presence of said inert solvent diluent in an amount which is in the ratio of about 18 to 30 parts per part of meta-xylylene diamine, by weight.

4. In a process for making 4,6-dimethyl-1,3-xylylene diisocyanate by phosgenation of 4,6-dimethyl-1,3-xylylene diamine dihydrochloride in an inert solvent, the improvement which comprises carrying out said phosgenation at a temperature of about 110° to 135° C. and in the presence of said inert solvent in an amount which is in the ratio of about 18 to 30 parts per part of said 4,6-dimethyl-1,3-xylylene diamine, by weight.

References Cited

UNITED STATES PATENTS

| | | | |
|---|---|---|---|
| 2,319,057 | 5/1943 | Hanford | 260—453 |
| 2,326,501 | 8/1943 | Siefken et al. | 260—453 |
| 2,683,160 | 7/1954 | Irwin | 260—453 |
| 2,644,007 | 6/1953 | Irwin | 260—453 |

CHARLES B. PARKER, *Primary Examiner.*

DOLPH H. TORRENCE, *Assistant Examiner.*